(12) United States Patent
Beattie et al.

(10) Patent No.: US 9,401,855 B2
(45) Date of Patent: Jul. 26, 2016

(54) METHODS AND APPARATUS TO DELIVER MEDIA CONTENT ACROSS FOREIGN NETWORKS

(75) Inventors: James Gordon Beattie, Bergenfield, NJ (US); Stephen J. Griesmer, Westfield, NJ (US); Arvind R. Mallya, Walnut Creek, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 593 days.

(21) Appl. No.: 12/262,991

(22) Filed: Oct. 31, 2008

(65) Prior Publication Data

US 2010/0115605 A1    May 6, 2010

(51) Int. Cl.
| | |
|---|---|
| H04L 12/26 | (2006.01) |
| H04L 12/54 | (2013.01) |
| H04L 12/24 | (2006.01) |
| H04L 12/911 | (2013.01) |
| H04L 12/915 | (2013.01) |
| H04L 29/08 | (2006.01) |

(52) U.S. Cl.
CPC ........ *H04L 43/0852* (2013.01); *H04L 12/5695* (2013.01); *H04L 41/5019* (2013.01); *H04L 43/16* (2013.01); *H04L 47/745* (2013.01); *H04L 47/785* (2013.01); *H04L 47/824* (2013.01); *H04L 41/509* (2013.01); *H04L 43/10* (2013.01); *H04L 67/322* (2013.01)

(58) Field of Classification Search
CPC .............................. H04L 63/08; H04L 63/083
USPC .............................................. 726/15; 705/50
See application file for complete search history.

(56) References Cited

U.S. PATENT DOCUMENTS

| | | | | |
|---|---|---|---|---|
| 5,859,895 | A   |  1/1999 | Pomp et al. | |
| 6,973,057 | B1* | 12/2005 | Forslow .......................... | 370/328 |
| 6,988,146 | B1* |  1/2006 | Magret et al. .................. | 709/238 |
| 7,068,640 | B2* |  6/2006 | Kakemizu et al. ............. | 370/349 |
| 7,111,163 | B1* |  9/2006 | Haney .................. | H04L 12/4633 |
| | | | | 709/227 |
| 7,123,587 | B1* | 10/2006 | Hass et al. ...................... | 370/238 |
| 7,154,416 | B1* | 12/2006 | Savage ............................ | 341/51 |
| 7,263,095 | B1* |  8/2007 | Sarkar .................. | H04L 12/5695 |
| | | | | 370/352 |
| 7,296,288 | B1* | 11/2007 | Hill et al. ........................... | 726/2 |
| 7,440,573 | B2* | 10/2008 | Lor et al. ........................ | 380/270 |
| 7,522,876 | B1* |  4/2009 | Meitzen et al. .................... | 455/7 |
| 7,546,125 | B2* |  6/2009 | Sharma et al. ................ | 455/436 |

(Continued)

OTHER PUBLICATIONS

Vaarala, "Secure IPv4 Mobility for Enterprise Users", 2004.*

(Continued)

*Primary Examiner* — Ondrej Vostal
(74) *Attorney, Agent, or Firm* — Hanley, Flight & Zimmerman, LLC

(57) ABSTRACT

Example methods and apparatus to deliver media content across foreign networks are disclosed. A disclosed example method includes receiving a request from a subscriber of a media provider, the media provider associated with a native network and identifying a foreign network associated with a current location of the subscriber. The example method also includes identifying at least one quality of service (QoS) parameter associated with the foreign network, comparing the at least one foreign network QoS parameter with a first threshold value, and at least one of prohibiting a service delivered by the media provider when the at least one foreign network QoS parameter fails to meet the first threshold value, or enabling the service when the at least one foreign network QoS parameter meets the first threshold value.

31 Claims, 7 Drawing Sheets

(56) References Cited

U.S. PATENT DOCUMENTS

Figure 1:
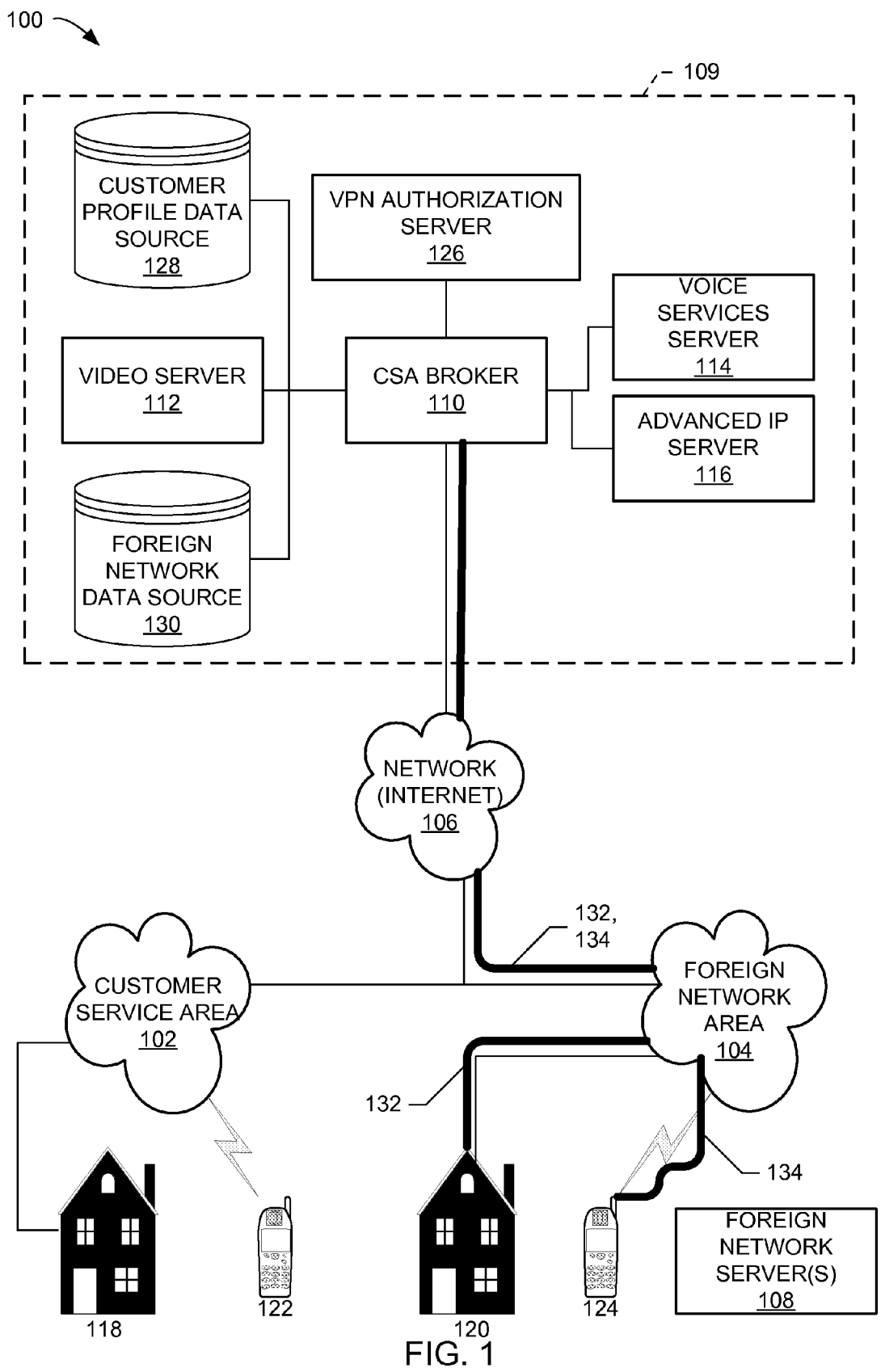

| | | | | |
|---|---|---|---|---|
| 7,596,385 | B2* | 9/2009 | Aghvami et al. | 455/552.1 |
| 7,649,909 | B1* | 1/2010 | Archard et al. | 370/477 |
| 7,664,048 | B1* | 2/2010 | Yung et al. | 370/253 |
| 7,698,244 | B2* | 4/2010 | Aaron | 706/47 |
| 7,760,636 | B1* | 7/2010 | Cheriton | 370/235 |
| 7,856,021 | B2* | 12/2010 | Hasegawa | H04L 12/4633 370/352 |
| 7,873,074 | B1* | 1/2011 | Boland | H04L 12/14 370/468 |
| 7,876,704 | B1* | 1/2011 | Bims | H04B 7/022 370/254 |
| 7,966,648 | B2* | 6/2011 | Park et al. | 726/2 |
| 7,969,886 | B1* | 6/2011 | Hoichman | 370/235 |
| 7,978,655 | B2* | 7/2011 | Taniuchi et al. | 370/331 |
| 8,072,879 | B2* | 12/2011 | Vasseur et al. | 370/225 |
| 8,189,482 | B2* | 5/2012 | Vasseur et al. | 370/238 |
| 8,276,035 | B1* | 9/2012 | Savarese | H04L 1/0007 714/749 |
| 8,484,338 | B2* | 7/2013 | Paster | 709/224 |
| 8,554,178 | B1* | 10/2013 | Swaminathan | H04L 67/322 370/248 |
| 2002/0018456 | A1* | 2/2002 | Kakemizu et al. | 370/338 |
| 2002/0095367 | A1* | 7/2002 | Mizunuma et al. | 705/37 |
| 2002/0116501 | A1* | 8/2002 | Ho et al. | 709/227 |
| 2002/0129150 | A1 | 9/2002 | Jung | |
| 2002/0198840 | A1* | 12/2002 | Banka et al. | 705/50 |
| 2003/0002468 | A1* | 1/2003 | Khalil et al. | 370/338 |
| 2003/0021253 | A1 | 1/2003 | Jung | |
| 2003/0039237 | A1* | 2/2003 | Forslow | 370/352 |
| 2003/0142681 | A1* | 7/2003 | Chen | H04L 12/5695 370/401 |
| 2003/0182363 | A1 | 9/2003 | Clough et al. | |
| 2003/0187979 | A1* | 10/2003 | Hekstra | H04L 12/5692 709/224 |
| 2003/0200321 | A1 | 10/2003 | Chen et al. | |
| 2003/0208602 | A1* | 11/2003 | Bhalla et al. | 709/227 |
| 2004/0008689 | A1* | 1/2004 | Westphal | H04L 29/06 370/395.21 |
| 2004/0120250 | A1* | 6/2004 | Langevin | H04L 41/0681 370/216 |
| 2004/0158706 | A1* | 8/2004 | Moritomo et al. | 713/153 |
| 2004/0204086 | A1 | 10/2004 | Choi et al. | |
| 2004/0215955 | A1* | 10/2004 | Tamai et al. | 713/150 |
| 2004/0225898 | A1* | 11/2004 | Frost et al. | 713/201 |
| 2004/0255164 | A1* | 12/2004 | Wesemann | 713/201 |
| 2005/0041808 | A1* | 2/2005 | He | 380/248 |
| 2005/0114490 | A1 | 5/2005 | Redlich et al. | |
| 2005/0114520 | A1 | 5/2005 | White et al. | |
| 2005/0144282 | A1* | 6/2005 | Argo | 709/226 |
| 2005/0163079 | A1* | 7/2005 | Taniuchi et al. | 370/331 |
| 2005/0207411 | A1* | 9/2005 | Ota et al. | 370/389 |
| 2006/0159088 | A1* | 7/2006 | Aghvami | H04L 45/24 370/389 |
| 2006/0187942 | A1* | 8/2006 | Mizutani et al. | 370/401 |
| 2006/0215548 | A1* | 9/2006 | Le Faucheur | H04L 45/22 370/228 |
| 2006/0221854 | A1* | 10/2006 | Price et al. | 370/253 |
| 2006/0246900 | A1* | 11/2006 | Zheng | 455/435.3 |
| 2006/0277288 | A1* | 12/2006 | Kelly et al. | 709/223 |
| 2007/0002868 | A1* | 1/2007 | Qian | H04W 28/24 370/395.21 |
| 2007/0030826 | A1* | 2/2007 | Zhang et al. | 370/331 |
| 2007/0041330 | A1* | 2/2007 | Bostica | H04W 24/00 370/252 |
| 2007/0074283 | A1* | 3/2007 | Croak et al. | 726/15 |
| 2007/0198739 | A1* | 8/2007 | Jennings et al. | 709/231 |
| 2007/0234418 | A1 | 10/2007 | Song et al. | |
| 2007/0249291 | A1* | 10/2007 | Nanda et al. | 455/73 |
| 2007/0283430 | A1* | 12/2007 | Lai et al. | 726/15 |
| 2008/0013557 | A1* | 1/2008 | Siemens et al. | 370/401 |
| 2008/0046266 | A1* | 2/2008 | Gudipalley | G06Q 10/00 370/230 |
| 2008/0056145 | A1* | 3/2008 | Woodworth | H04N 7/147 370/252 |
| 2008/0069007 | A1* | 3/2008 | Vasseur et al. | 370/254 |
| 2008/0075035 | A1* | 3/2008 | Eichenberger | 370/328 |
| 2008/0095058 | A1* | 4/2008 | Dalmases et al. | 370/237 |
| 2008/0123604 | A1 | 5/2008 | Shimizu | |
| 2008/0130515 | A1* | 6/2008 | Vasseur | 370/254 |
| 2008/0139197 | A1* | 6/2008 | Misra et al. | 455/423 |
| 2008/0192629 | A1* | 8/2008 | Chari | 370/230 |
| 2008/0195760 | A1* | 8/2008 | Nudler | 709/248 |
| 2008/0198755 | A1* | 8/2008 | Vasseur et al. | 370/248 |
| 2008/0198858 | A1* | 8/2008 | Townsley et al. | 370/401 |
| 2008/0205272 | A1* | 8/2008 | Vasseur et al. | 370/235 |
| 2008/0212495 | A1 | 9/2008 | Stirbu | |
| 2008/0216168 | A1* | 9/2008 | Larson et al. | 726/15 |
| 2008/0220768 | A1 | 9/2008 | Bose et al. | |
| 2008/0244040 | A1* | 10/2008 | Bhatia | H04L 12/5855 709/219 |
| 2008/0247326 | A1* | 10/2008 | Cormier et al. | 370/252 |
| 2008/0267196 | A1* | 10/2008 | Menth et al. | 370/401 |
| 2008/0279216 | A1* | 11/2008 | Sharif-Ahmadi | H04L 47/10 370/465 |
| 2008/0310344 | A1* | 12/2008 | Krishnan et al. | 370/328 |
| 2009/0034557 | A1* | 2/2009 | Fluhrer et al. | 370/474 |
| 2009/0040987 | A1* | 2/2009 | Hirano et al. | 370/338 |
| 2009/0094347 | A1* | 4/2009 | Ting et al. | 709/219 |
| 2009/0113071 | A1* | 4/2009 | Kotrla et al. | 709/242 |
| 2009/0138577 | A1* | 5/2009 | Casado | H04L 41/06 709/220 |
| 2009/0147684 | A1* | 6/2009 | Majidi-Ahy | H04L 12/66 370/236 |
| 2009/0154658 | A1* | 6/2009 | Kasper | H04L 1/0014 379/32.01 |
| 2009/0158398 | A1* | 6/2009 | Pandey et al. | 726/4 |
| 2009/0170475 | A1* | 7/2009 | Ch'ng et al. | 455/411 |
| 2009/0183085 | A1* | 7/2009 | Pasetto | G06F 3/1431 715/744 |
| 2009/0190550 | A1* | 7/2009 | Giustina et al. | 370/331 |
| 2009/0196170 | A1* | 8/2009 | Ayyagari et al. | 370/221 |
| 2009/0248708 | A1* | 10/2009 | Balasubramanian et al. | 707/100 |
| 2009/0253392 | A1* | 10/2009 | Colonna | 455/161.3 |
| 2009/0280849 | A1* | 11/2009 | Rosen | H04L 12/5695 455/518 |
| 2009/0285108 | A1* | 11/2009 | Venugopal et al. | 370/252 |
| 2010/0009696 | A1* | 1/2010 | Fok et al. | 455/456.1 |
| 2010/0023993 | A1* | 1/2010 | Bugenhagen | G06Q 30/02 725/133 |
| 2010/0083303 | A1* | 4/2010 | Redei | H04N 7/17318 725/32 |
| 2010/0103872 | A1* | 4/2010 | Park | H04L 45/24 370/328 |
| 2010/0150150 | A1* | 6/2010 | Paz | H04L 47/24 370/389 |
| 2010/0228859 | A1* | 9/2010 | Backstrom et al. | 709/225 |
| 2010/0260100 | A1* | 10/2010 | Kerr | H04L 12/66 370/328 |
| 2010/0299433 | A1* | 11/2010 | De Boer et al. | 709/224 |
| 2011/0013520 | A1* | 1/2011 | Dunn | H04L 41/0659 370/242 |

OTHER PUBLICATIONS

Bauer et al., "Infrastructure-based Route Optimization for NEMO based on Combined Local and Global Mobility", 2008.*
Merriam Webster, "Full Definition of Bandwidth", 2014.*
Zhang et al., "Building MPLS VPNs with QoS Routing Capability", 2000.*
Baker et al., "Quality of Service (QoS) Signaling in a Nested Virtual Private Network", RFC 4923, 2007.*
Terzis et al., "RSVP Operation Over IP Tunnels", RFC 2746, 2000.*
Shenker et al., "Specification of Guaranteed Quality of Service", RFC 2212, 1997.*
Merriam-Webster, "prevent", 2016.*
Merriam-Webster, "prohibit", 2016.*

* cited by examiner

300

| SERVICE BROKER LOCATION | TIME OF DAY | FOREIGN SERVER IDENTIFIER | DIST. (miles) | LATENCY (mSec) | DOWNLOAD SPEED (Mb/sec) | UPLOAD SPEED (Mb/sec) |
|---|---|---|---|---|---|---|
| Westfield, NJ | 10-11:59 | Austin, TX (Carrier B) | ~1700 | 118 | 19.49 | 2.97 |
| Westfield, NJ | 10-11:59 | Austin, TX (Carrier C) | ~1700 | 33 | 18.3 | 3.14 |
| Westfield, NJ | 10-11:59 | San Fran, CA | ~2800 | 187 | 16.1 | 4.18 |
| Westfield, NJ | 10-11:59 | Kansas City, MO (Carrier B) | ~1100 | 120 | 17.4 | 3.78 |
| Westfield, NJ | 10-11:59 | Kansas City, MO (Carrier J) | ~1100 | 45 | 18.1 | 3.92 |
| ... | ... | ... | ... | ... | ... | ... |
| Portland, OR | 2-3:59 | Austin, TX (Carrier B) | ~2300 | 105 | 18.7 | 3.03 |
| Portland, OR | 2-3:59 | Austin, TX (Carrier C) | ~2300 | 41 | 14.3 | 2.1 |
| Portland, OR | 2-3:59 | San Fran, CA | ~650 | 123 | 12 | 3.81 |
| Portland, OR | 2-3:59 | Kansas City, MO (Carrier B) | ~1700 | 132 | 16.6 | 2.8 |
| Portland, OR | 2-3:59 | Kansas City, MO (Carrier J) | ~1700 | 49 | 15.43 | 3.2 |
| ... | ... | ... | ... | ... | ... | ... |

FIG. 3

METHODS AND APPARATUS TO DELIVER MEDIA CONTENT ACROSS FOREIGN NETWORKS

FIELD OF THE DISCLOSURE

This disclosure relates generally to customer media services and, more particularly, to methods and apparatus to deliver media content across foreign networks.

BACKGROUND

Service providers of telecommunications, Internet access, Voice over Internet Protocol (VoIP), video, electronic mail (e-mail), hosting, security, and/or mobile communications (for example, "cellular" telephones) typically manage and/or operate in one or more service areas. Customers that reside or are otherwise present within a service area may enjoy all of the service features offered by the service provider, and such customers typically expect that those features will operate to their fullest extent. In other words, in the event that high-definition mobile video services are provided by the service provider, the customers within the service area expect, for example, that the video quality, frame rate, and/or corresponding audio content will perform at an optimum level.

In the event that the customer leaves the service area managed by the service provider, any services utilized by the customer are typically routed through an available foreign network, such as a competitive service provider of wireless services and/or internet access. One or more of the services may not function when the customer is located in the foreign network service area or, if such services do function, a lesser degree of quality and/or performance may result. In some circumstances, the foreign network may monitor the type of data accessed by the customer while present in the foreign network service area and throttle or otherwise prohibit certain types of data.

For example, the foreign network service provider may identify that the customer is using a handset and receiving/sending high-definition video over the foreign network. To preserve bandwidth consumption, the foreign network service provider may then disable such high-definition data transfer and/or limit the available bandwidth to the handset.

BRIEF DESCRIPTION OF THE DRAWINGS

FIG. 1 is a schematic illustration of an example communication system constructed in accordance with the teachings of this disclosure.

FIG. 2 is a schematic illustration of an example customer service area broker shown in FIG. 1.

FIG. 3 is an example table representative of foreign network characteristic parameters.

FIGS. 4A, 4B, and 5 flowcharts representative of example machine-accessible instructions that may be executed by, for example, the example customer service area broker shown in FIGS. 1 and 2.

FIG. 6 is a schematic illustration of an example processor platform that may be used and/or programmed to carry out the example machine-accessible instructions of FIGS. 4A, 4B, and 5, and/or to implement any or all of the example methods and apparatus described herein.

DETAILED DESCRIPTION

Example methods and apparatus to deliver media content across foreign networks are disclosed. A disclosed example method includes receiving a request from a subscriber of a media provider, the media provider associated with a native network and identifying a foreign network associated with a current location of the subscriber. The example method also includes identifying at least one quality of service (QoS) parameter associated with the foreign network, comparing the at least one foreign network QoS parameter with a first threshold value, and at least one of prohibiting a service delivered by the media provider when the at least one foreign network QoS parameter fails to meet the first threshold value, or enabling the service when the at least one foreign network QoS parameter meets the first threshold value.

A disclosed example apparatus includes a services request manager to receive a media service request from a subscriber, the services request manager to identify whether the subscriber request originates from a foreign network. The example apparatus also includes a foreign network quality manager to identify a QoS of the foreign network and a virtual private network (VPN) manager to establish a VPN tunnel between the subscriber and a media service provider when the foreign network QoS exceeds a QoS threshold value.

In the interest of brevity and clarity, throughout the following disclosure, references will be made to the example communication system 100 of FIG. 1. However, the methods and apparatus described herein to deliver media content across foreign networks are applicable to other types of systems and/or networks constructed using other network technologies, topologies, and/or protocols.

Customers that reside within and/or are otherwise present within a service area including infrastructure owned and/or managed by their service provider (hereinafter referred to as the "customer service area") typically enjoy all of the service features to which the customer subscribes. For example, the customer service provider may manage infrastructure that allows its customers to utilize voice services, VoIP services, e-mail services, Internet access, telephony, and/or one or more types of audio/video (A/V) services, such as high-definition video services. Each example service provided by the service provider is typically associated with one or more parameters that characterize a QoS, such as a bandwidth, an upload speed and/or a download speed (for example, as measured by units of megabytes per second (Mb/s)), a number of frames per second, a resolution, and/or a latency (for example, as measured by units of milliseconds (mSec)).

In the event that the customer is present within the customer service area, such as a personal computer connected to the service provider network and/or a mobile handset used by the customer in the customer service area, that customer typically expects the services will operate within optimized QoS limits and/or operate with an optimum quality. In particular, for customers requiring near real-time services, any latency parameter above 50 mSec is typically considered unacceptable for voice communications. In particular, Internet and/or network latency values that exceed approximately 50 mSec typically result in noticeable and/or annoying lags during voice communication for VoIP services. On the other hand, customers that are less sensitive and/or concerned with real-time services may not have particular concern with QoS parameters related to latency, but have a greater concern for QoS parameters related to resolution, download speed, and/or frame-rate. For example, customers that receive A/V services at a set-top box in a household and/or via a mobile handset (such as, for example, a wireless telephone, a smart phone, etc.) may expect a relatively high degree of video and/or audio quality to enjoy watching media, such as television programs, news programs, sit-coms, and/or movies. While such media may require a relatively high degree of network download bandwidth (as compared to, for example, VoIP communications), because media services typically do not consume substantial uploading activity, the latency parameter is less significant when qualifying an overall QoS for media delivery.

Customers that leave a service area associated with their service provider may experience one or more situations in which one or more services do not function and/or one or more services function, but at a different QoS. For example, customers outside the boundaries of the customer service area typically still consume some services, such as telephony, text messaging, and/or Internet access via one or more foreign networks. The foreign network(s) may be owned, operated, and/or managed by a competitor of the service provider. However, because the foreign network(s) are not under the management and/or control of the service provider, no guarantees regarding available services and/or the QoS for such services can be provided to the customer. In some instances, the reason for service unavailability is due to poor network infrastructure quality and/or inferior capabilities of the foreign network(s). In other instances, the reason for service unavailability is due to the foreign network(s) blocking certain types of network communication protocol(s) and/or constraining/throttling one or more bandwidth parameters associated with the one or more network services. The foreign network(s) may monitor network traffic in an effort to identify one or more types of network communication activity, which is sometimes referred to as network sniffing. If the foreign network service provider identifies network traffic that is associated with video, A/V, and/or high-definition video services, which typically consume relatively large amounts of network bandwidth, that foreign network service provider may block further communications by the user attempting to use such services. On the other hand, the foreign network service provider does not typically block one or more services that is less bandwidth intensive and/or demanding on the network, such as voice data and/or text data.

The example methods and apparatus described herein permit, in part, service provider customers to utilize network services when located outside the customer service area. Additionally, the example methods and apparatus described herein allow the customers to utilize the one or more services while located in a foreign network, in which the one or more services are adjusted to accommodate to QoS limitations that may be caused by the foreign network.

FIG. 1 is a schematic illustration of the example communication system 100, which includes any number of customer service areas and foreign network areas. In the illustrated example of FIG. 1, a customer service area (CSA) 102 and a foreign network area 104 are each connected to a network 106, such as the Internet. The CSA 102 is also referred to as a native network that is owned, operated, and/or otherwise under the control of a media provider and/or media distributor. Each of the CSA 102 and the foreign network area 104 may include infrastructure to support a corresponding customer base of subscribers. Infrastructure of the example CSA 102 and/or the example foreign network area 104 may include, but is not limited to, telecommunications equipment, such as public switched telephone network (PSTN) equipment, intranet and/or Internet routing equipment, such as network routers, hubs, and/or switches, network nodes, and/or wireless communication towers to facilitate wireless handset communications. Services provided by the example foreign network area 104 are facilitated by one or more foreign network server(s) 108, while services provided by the example CSA 102 are facilitated by an example media distribution system 109, which includes one or more of an example CSA broker 110, an example video server 112, an example voice services server 114, and/or an example advanced Internet protocol (IP) server 116.

Customers of the example media distribution system 109 (that is, the service provider associated with the example CSA 102) may include household subscribers 118 directly connected to the CSA 102, and/or household subscribers 120 located within and/or directly connected to the foreign network area 104. The example household subscribers may include, but are not limited to, subscribers of television services, telephony services, Internet access, and/or VoIP services. Household equipment may include, but is not limited to, personal computers, VoIP telephones, media set-top boxes, Internet radios, etc. Additionally, customers of the media distribution system 109 may also include wireless subscribers, such as a subscriber with a wireless handset 122 located within the vicinity of the CSA 102, and/or a subscriber with a wireless handset 124 located outside the vicinity of the CSA 102, but within the vicinity of the foreign network area 104.

As described in further detail below, the example media distribution system 109 includes a VPN authorization server 126 to establish one or more VPN session(s)/tunnel(s) with subscribers of the media distribution system 109. Additionally, the media distribution system 109 includes an example customer profile data source 128 to, in part, maintain service performance preferences for one or more services that the customer(s) may use when located within one or more foreign network areas, such as the example foreign network area 104. The example media distribution system 109 also includes a foreign network data source 130 to store information related to one or more foreign network areas and their corresponding parameters associated with QoS.

As described above, at least one problem associated with a household subscriber 120 and/or a wireless subscriber 124 in the vicinity of the foreign network area 104, but outside the available communication reach of the CSA 102, is that one or more services desired by customers of the media distribution system 109 may be blocked, disabled, and/or crippled. Such services may be blocked, disabled, and/or crippled by virtue of limitations of the foreign network area 104 infrastructure capabilities and/or intentional acts of service providers of the foreign network area 104. In some examples, the service providers of the foreign network area 104 may block access attempts of outsiders, such as the example household subscriber 120 and/or the wireless subscriber 124, to preserve infrastructure resources for their own customer base. As a result, subscribers of the example media distribution system 109 may become annoyed and/or frustrated by the lack of services availability and/or an associated QoS expectation when attempting to utilize services through the foreign network area 104. Such frustrations may ultimately cause the subscribers to leave and/or otherwise terminate their relationship with the service provider associated with the media distribution system 109.

To address service availability needs of customers of the example media distribution system 109, the example CSA broker 110 identifies access requests of native subscribers at a network node, such as the example household subscriber 118 and the wireless subscriber 122, each of which are within the vicinity of the CSA 102. The example CSA broker 110 also identifies access requests of remote subscribers, such as the example node(s) corresponding to household subscriber 120 and the wireless subscriber 124, each of which is within the vicinity of the foreign network area 104. In the event that the example CSA broker 110 receives an access request from one or more subscribers that reside within and/or are otherwise present within the vicinity of the CSA 102, the CSA broker 110 enables all services to be used by the requesting subscriber. In other words, because the requesting subscriber(s) are utilizing the native infrastructure over which the service provider has control, the service provider of the media distribution system 109 may feel confident that all services may be provided while satisfying one or more QoS standards deemed acceptable to its customers.

On the other hand, in the event that the example CSA broker 110 receives an access request from one or more subscribers via the foreign network area 104, then the example CSA broker 110 establishes a VPN tunnel between the media distribution system 109 and the subscriber node (also referred to as an originating node of the service request), such as the example household subscriber 120 and/or the example wireless subscriber 124. Generally speaking, a service provider of a foreign network, such as a service provider of the example foreign network area 104, will not prohibit and/or otherwise block network communication related to relatively low bandwidth activity. As such, access requests by the example household subscriber 120 and/or wireless subscriber 124 are not likely to raise concerns of the foreign network area 104 due to such access requests being devoid of, for example, high-bandwidth video traffic and/or high-bandwidth audio traffic.

Prior to the example media distribution system 109 transmitting and/or otherwise facilitating one or more services that may require high-bandwidth resources, the example CSA broker 110 establishes the VPN tunnel to prevent detection of network traffic content between the system 109 and one or more subscribers' nodes 120, 124. As used herein, network traffic content includes, but is not limited to, one or more data types and/or network protocols. In other words, the VPN tunnel permits data communications (e.g., voice, video, text, data, etc.) that may otherwise be blocked by the example foreign network area 104. Even in circumstances where the foreign network area 104 does not totally prohibit one or more types of network traffic, but merely throttles/limits a bandwidth of such types of network traffic, the established VPN tunnel facilitates an improved bandwidth performance metric by concealing any detection of the network data types. Generally, a VPN is a private network that uses a public (for example, the Internet) and/or foreign network to connect remote sites/users. In particular, a VPN tunnel provides secure communications through a network, such as the Internet and/or one or more foreign networks. Typically, establishing the VPN tunnel includes verification of authentication credentials and/or content encryption, which prevents any third party from sniffing network traffic, thereby concealing any discovery of network protocols used in the tunnel. Without limitation, the VPN may employ symmetric-key encryption, public-key encryption, Internet protocol security protocol (IPSec), and/or authentication, authorization and accounting (AAA) servers.

In the illustrated example of FIG. 1, a first VPN tunnel 132 is created in response to a request from the household subscriber 120. The example first VPN tunnel 132 enables secure network communication between the household subscriber 120, through the foreign network area 104, through the network 106, and to the CSA broker 110 of the example media distribution system 109. Similarly, in response to a service request by the example wireless subscriber 124, such as a relatively low bandwidth e-mail, text message, and/or voice call through the foreign network area 104 to the CSA broker 110, the example VPN authorization server 126 facilitates a second example VPN tunnel 134. After one or more VPN tunnels are initiated between customers and the media distribution system 109, any network through which the VPN tunnel propagates cannot monitor the network traffic and identify one or more traffic data type(s). In other words, the VPN tunnel conceals the network traffic and associated protocols. For example, after the household subscriber 120 and/or the wireless subscriber 124 establish the first and second VPN tunnels 132, 134, the example media distribution system 109 may send/receive any type of media without concern that the network 106 and/or the foreign network area 104 are monitoring transmitted data. The VPN tunnel hides/conceals transmitted data from any attempted observation at the foreign network area 104 and/or the network 106. Thus, any attempts of the foreign networks (e.g., the example foreign network area 104) to monitor or block the information are unsuccessful.

Continuing the above example, if an administrator of the example foreign network area 104 normally monitored network traffic for the presence of certain types of data and/or protocols, such as video data, the established first VPN tunnel 132 and/or second VPN tunnel 134 prevents that administrator from further monitoring. Accordingly, the service provider associated with the media distribution system 109 is then free to send/receive any type of data and/or protocols without concern for a block in response to protocol type identification by a foreign network system and/or administrator.

While the aforementioned methods and apparatus describe, in part, establishing one or more VPN tunnels to facilitate transmission and/or reception of one or more network data types, in other circumstances, one or more services are available to a customer of the media distribution system 109 within the foreign network area 104, but such services exhibit poor performance. Poor performance may be due to, for example, limitations of the infrastructure associated with the foreign network area 104 and/or time-of-day demands by customers associated with the foreign service provider. The poor performance of one or more services may further violate QoS expectations of the customer, which may result in aggravation and/or frustration by the customer. However, the methods and apparatus described herein facilitate, in part, adjustment of the service parameters associated with the one or more services provided by the example media distribution system 109 to improve the overall customer experience. In particular, the methods and apparatus described herein identify one or more performance parameter limitations of the foreign network area 104 and/or the network 106 and adjust the performance parameters of the one or more services requested by the customer to improve the overall experience of the customer when using such services. Without limitation, the methods and apparatus described herein may adjust the performance parameters of one or more services independently or in addition to methods and apparatus to establish one or more VPN tunnels to facilitate one or more network data type communications in a concealed manner.

For example, for customers of the example media distribution system 109 that require real-time and/or near real-time data services, the example CSA broker 110 adjusts the delivered services so that one or more quality parameters of the delivered service are reduced in an effort to maintain and/or improve parameters related to network responsivity, such as latency. One example quality parameter that the CSA broker 110 may adjust is a number of frames per second of video delivered by the media distribution system, which may result in improved latency parameters by virtue of consuming less network bandwidth. Generally speaking, in this example the CSA broker 110 may reduce one or more parameters associated with media quality to improve one or more parameters related to throughput. However, in circumstances where real-time network communication is not required, but one or more quality parameters is preferred, then the example CSA broker 110 may employ one or more buffers in view of observed performance deficiencies of the example foreign network area 104. In that case, the customer may experience a longer waiting period prior to receiving/sending data, but such data will still contain the requisite quality (for example, a relatively high frames-per-second data stream, a relatively high resolution, high-definition video, etc.). For example, the customer may be accustomed to receiving certain types of content (e.g., content associated with specific protocol types) streamed to their device (e.g., a wireless phone) without substantial delay and/or buffering requirements when in their home network area(s), such as the example customer service area 102. Thus, the CSA broker 110 can make trade-offs after considering the subscriber needs or desires and the constraints of the foreign network.

Figure 2:
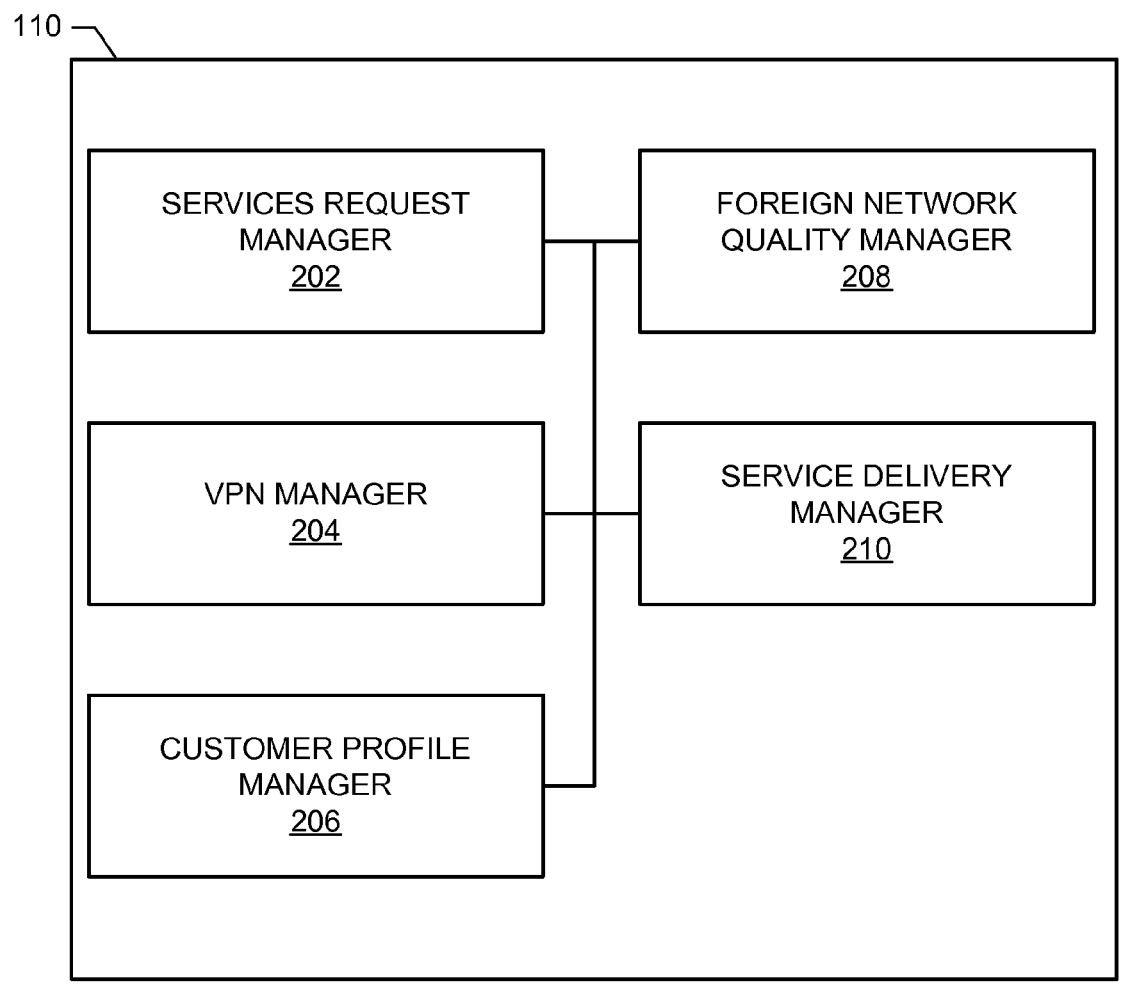

FIG. 2 is a detailed schematic illustration of the example CSA broker 110 of FIG. 1. The example CSA broker 110 includes a services request manager 202, a VPN manager 204, a customer profile manager 206, a foreign network quality manager 208, and a service delivery manager 210. In operation, the example services request manager 202 receives a request from a customer and determines whether the customer is making such request from the CSA 102 or from the foreign network area 104. In other words, the example services manager 202 determines an ownership status associated with the network from which the customer originates the request for services (the customer's origination node). If the request originates from a customer that resides in the CSA 102, such as the example household subscriber 118, then the example service delivery manager 210 directs the media distribution system 109 to deliver such services to the fullest extent possible. In other words, because the request for services originates within the service provider's own network, a greater confidence exists that the network is capable of both providing all requested services and at a QoS expected by the customer. Thus, the example service delivery manager 210 directs the example video server 112 to deliver video services at the highest requested quality (for example, high-definition video), directs the example voice services server 114 to deliver voice services at the highest requested quality, and/or directs the advanced IP server 116 to deliver any other IP related services at the highest requested quality (for example, music at 192 kbit/second).

However, if the services request manager 202 determines that the request originates from a customer that is present within the foreign network area 104 or the network 106 (for example, the Internet, a public access point of an intranet, etc.), then the services request manager 208 determines a server name, an originating IP address, a uniform resource locator (URL), and/or a router name associated with the foreign network area 104. Generally speaking, a request for services from any network node is typically associated with header information, which includes an originating IP address, a URL, and/or additional node IP addresses that may identify one or more additional routers traversed. The example services request manager 202 invokes the VPN manager 204 to establish a VPN tunnel at the originating node associated with the requesting customer (for example household subscriber 120 connected to the foreign network area 104) via the VPN authorization server 126. In the illustrated example of FIGS. 1 and 2, authentication credentials and/or security protocols to establish the VPN tunnel 132 are managed by the example VPN authorization server 126.

In this example, after creating the example VPN tunnel 132 between the media distribution system 109 and the household subscriber 120, the example services request manager 202 invokes the foreign network quality manager 208 to query the foreign network data source 130 in an effort to determine QoS parameters of the foreign network area associated with the requesting customer (in this example, the household subscriber 120). Data received from the example foreign network data source 130 may include one or more foreign network performance parameters for the corresponding network at which the requesting customer is located. Network performance parameters may include, but are not limited to, a distance between the media distribution system 109 and foreign network equipment, a latency value in milliseconds, a download speed, packet losses, and/or an upload speed. Each network performance parameter may further be categorized by a time-of-day at which each value was measured. Further, network performance parameters may represent a value measured at one point in time, or may represent an average value. As described in further detail below, the example CSA broker 110 invokes the foreign network quality manager 208 on a periodic, aperiodic, scheduled, event-based, and/or manual basis to perform one or more performance queries of known foreign networks, servers, and/or routers of the foreign networks.

To determine whether the foreign network, such as the example foreign network area 104, satisfies one or more QoS threshold parameters established by the example media distribution system 109, the example foreign network quality manager 208 compares such threshold parameters against the performance parameters returned from the foreign network data source 130 query. In the event that the foreign network area 104 meets or exceeds the QoS threshold parameters established by the example media distribution system 109, then the service delivery manager 210 enables all available services of the media distribution system 109. Further, all enabled services are also provided to the requesting customer (for example, the household subscriber 120) at a maximum or preferred quality and/or rate. On the other hand, in the event that the foreign network area 104 fails to meet one or more of the QoS threshold parameters established by the example media distribution system 109, then one or more service availability adjustments may be invoked to minimize negative experiences by the requesting customer and/or to maximize performance characteristics for the requesting customer in view of an inferior foreign network. As described above, service availability adjustments may include disabling one or more services, reducing a quality parameter of one or more services, and/or facilitating a buffer in view of foreign network data speed limitations.

Additionally, in the event that the example foreign network area 104 fails to meet one or more QoS threshold parameters established by the example media distribution system 109, then the services request manager 202 invokes the example customer profile manager 206 to determine whether the requesting customer has a preference regarding service tradeoffs. For example, the customer profile manager 206 may determine, after querying the customer profile data source 128 for profile information associated with the requesting customer, that real-time service functionality is a higher priority than quality. In that case, the example customer profile manager 206 directs the service delivery manager 210 to reduce one or more quality related metrics of the requested service in an effort to minimize latency of that requested service. Continuing with the aforementioned example, if the requested service is an A/V conference, in which one or more parties are conducting an on-line video conference meeting, then the service delivery manager 210 will reduce the value of frames-per-second of the video and/or reduce the value of bits-per-second of the audio. As such, the required bandwidth of the A/V conference is reduced while preserving and/or reducing the latency of the A/V conference. Generally speaking, any number of threshold values may be employed to determine whether any services should be provided at all, whether services should be provided at an adjusted quality, and/or whether all available services should be enabled despite the fact that the customer is tunneled-in from a foreign network.

FIG. 3 is an example table 300 illustrating example data contained in the foreign network data source 130 of FIG. 1. In the illustrated example of FIG. 3, the table 300 includes a CSA broker location column 302, a time-of-day column 304, a foreign server identifier column 306, a distance column 308, a latency column 310, a download speed column 312, and an upload speed column 314. As described in further detail below, the example foreign network quality manager 208 maintains and updates the table 300 on a periodic, aperiodic, scheduled, event based, and/or manual basis with one or more QoS parameters, such as parameters in the latency column 310, the download speed column 312, and/or the upload speed column 314.

While the example communication system 100 of FIG. 1 includes a single example media distribution system 109, any number of similar media distribution systems may be implemented in the example communication system 100. For example, one or more additional media distribution systems may be located in one or more geographic locations of a municipality, a state, a region, and/or a country to accommodate any number of customers/subscribers. As such, the example CSA broker location column 302 of the table 300 identifies a CSA broker location, in which each row includes corresponding parameters of network performance when communicating with a foreign network. To illustrate, a first row 316 of the example table 300 includes network performance parameters between a CSA broker located in Westfield, N.J. and a foreign server located in Austin, Tex. The example time-of-day column 304 identifies a corresponding time-of-day in which the network performance parameters were obtained. The time-of-day information is particularly useful to, for example, identify which foreign networks may have a better ability of accommodating services when network demands are particularly high, such as during regular business hours versus evening hours. In the event that the media distribution system 109 includes a first threshold latency of, for example, sixty milliseconds, then the foreign server shown in row 316 would be deemed unacceptable. As such, the example CSA broker 110 may disable one or more requested services to a customer connected to a node on that foreign network. On the other hand, in the event that the media distribution system 109 includes a second latency threshold of, for example, forty milliseconds, then the foreign server shown in row 318 would be deemed partially acceptable because the latency of forty-five milliseconds resides between the range of the second threshold and the minimally acceptable first threshold value of sixty milliseconds.

The example foreign server identifier 306 may identify the foreign network area, such as the example foreign network area 104 of FIG. 1, by a location name, a location name plus a corresponding carrier name, a URL, and/or an IP address. As described above, the requesting customer typically includes a request to the CSA broker 110 that includes header information having an originating IP address. The received originating IP address may be referenced against any number of geolocation data sources to ascertain a general locality, such as a city name, and/or specific foreign carrier associated with the received originating IP address. Example geolocation may be performed by initiating a WHOIS query/response protocol, queries to one or more regional Internet registers, such as, for example, the American Registry for Internet Numbers (ARIN), the Reseaux IP European Network Coordination Center (RIPE NCC), the Asia Pacific Network Information Center (APNIC), and/or the Latin American and Caribbean Internet Addresses Registry (LACNIC). The example distance column 308 includes a distance between the CSA broker location and the foreign server location, which may be calculated by the example foreign network quality manager.

To determine a latency value, for any foreign server identifier, such as the latency values shown in the example latency column 310, the example foreign network quality manager 208 performs one or more network speed tests between the CSA broker 110 and the corresponding foreign network area. One example network speed test includes, but is not limited to, a trace-route to identify a list of hosts traversed by packets en route to a destination, and corresponding latency times. Another network speed test may include a ping test to ascertain round trip packet times and/or packet loss information. Without limitation, one or more upload speeds and/or downloads speeds may be determined by sending a known quantity of data to/from any source and destination. Values identified in the example latency column 310, the example download speed column 312, and/or the example upload speed column 314 may be instantaneous values calculated at the time of testing. However, such values may also be aggregated over one or more tests to identify an average value.

While the example communication system 100 has been illustrated in FIG. 1, one or more of the interfaces, data structures, elements, processes and/or devices illustrated in FIGS. 1 and 2 may be combined, divided, re-arranged, omitted, eliminated and/or implemented in any other way. Further, the example CSA broker 110, the example services request manager 202, the example VPN manager 204, the example customer profile manager 206, the example foreign network quality manager 208, and/or the example service delivery manager 210 of FIGS. 1, and 2 may be implemented by hardware, software, firmware and/or any combination of hardware, software and/or firmware. Thus, for example, any or the example CSA broker 110, the example services request manager 202, the example VPN manager 204, the example customer profile manager 206, the example foreign network quality manager 208, and/or the example service delivery manager 210 may be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended claims are read to cover a purely software and/or firmware implementation, at least one of the example CSA broker 110, the example services request manager 202, the example VPN manager 204, the example customer profile manager 206, the example foreign network quality manager 208, and/or the example service delivery manager 210 are hereby expressly defined to include a tangible medium such as a memory, a digital versatile disc (DVD), a compact disc (CD), etc. storing the firmware and/or software. Further still, a communication system may include interfaces, data structures, elements, processes and/or devices instead of, or in addition to, those illustrated in FIGS. 1 and 2 and/or may include more than one of any or all of the illustrated interfaces, data structures, elements, processes and/or devices.

Figure 4A:
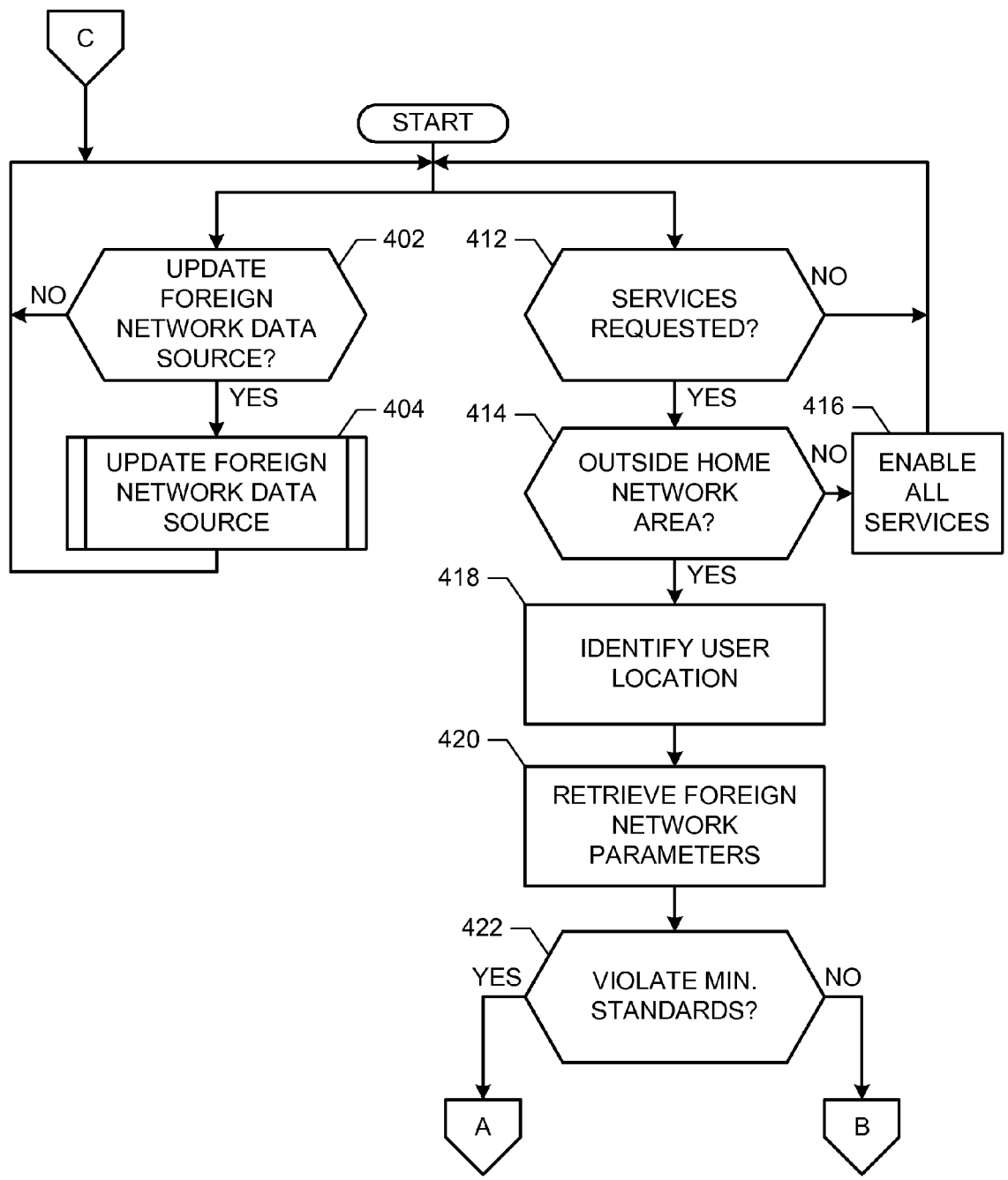
Figure 4B:
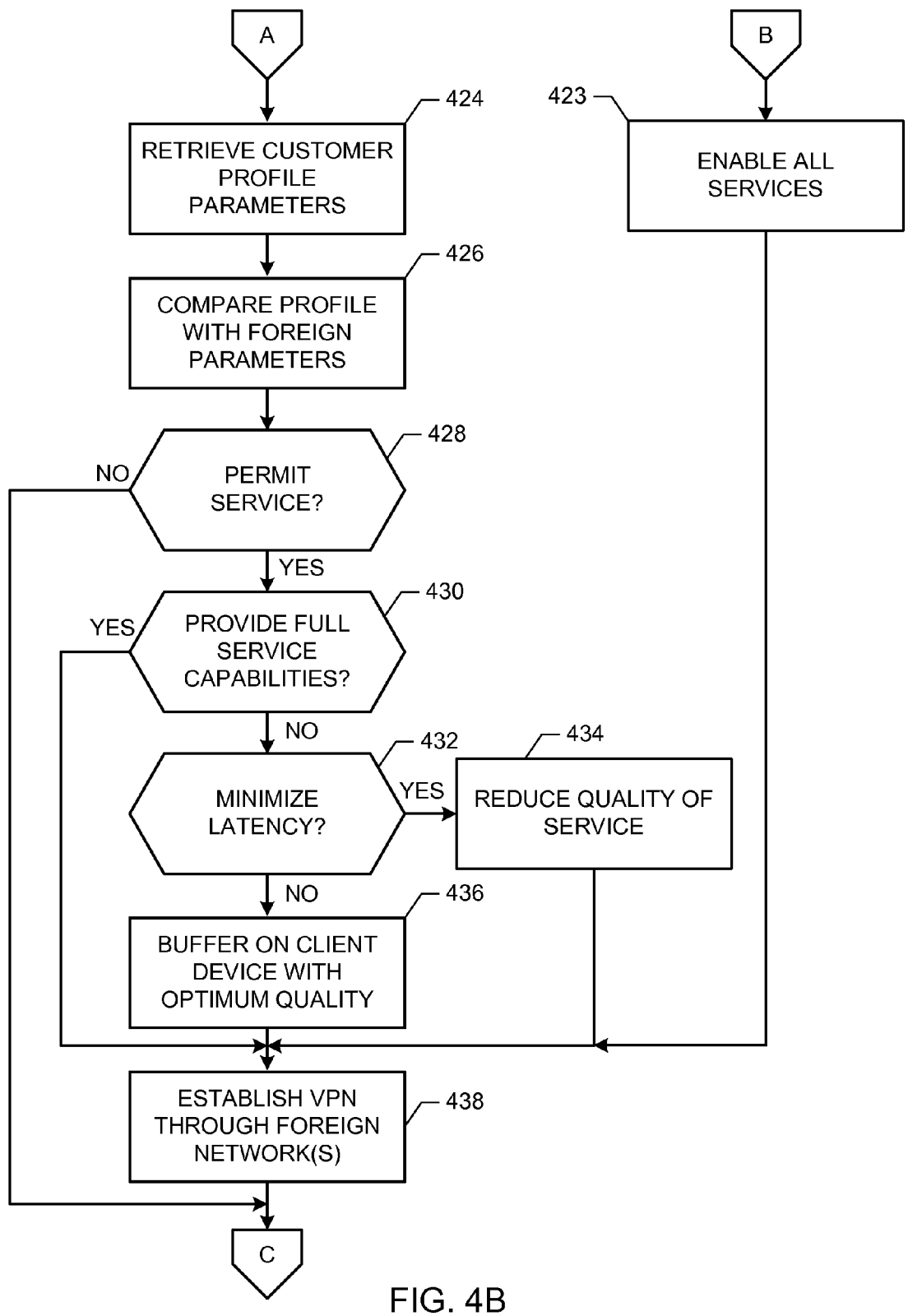
Figure 5:
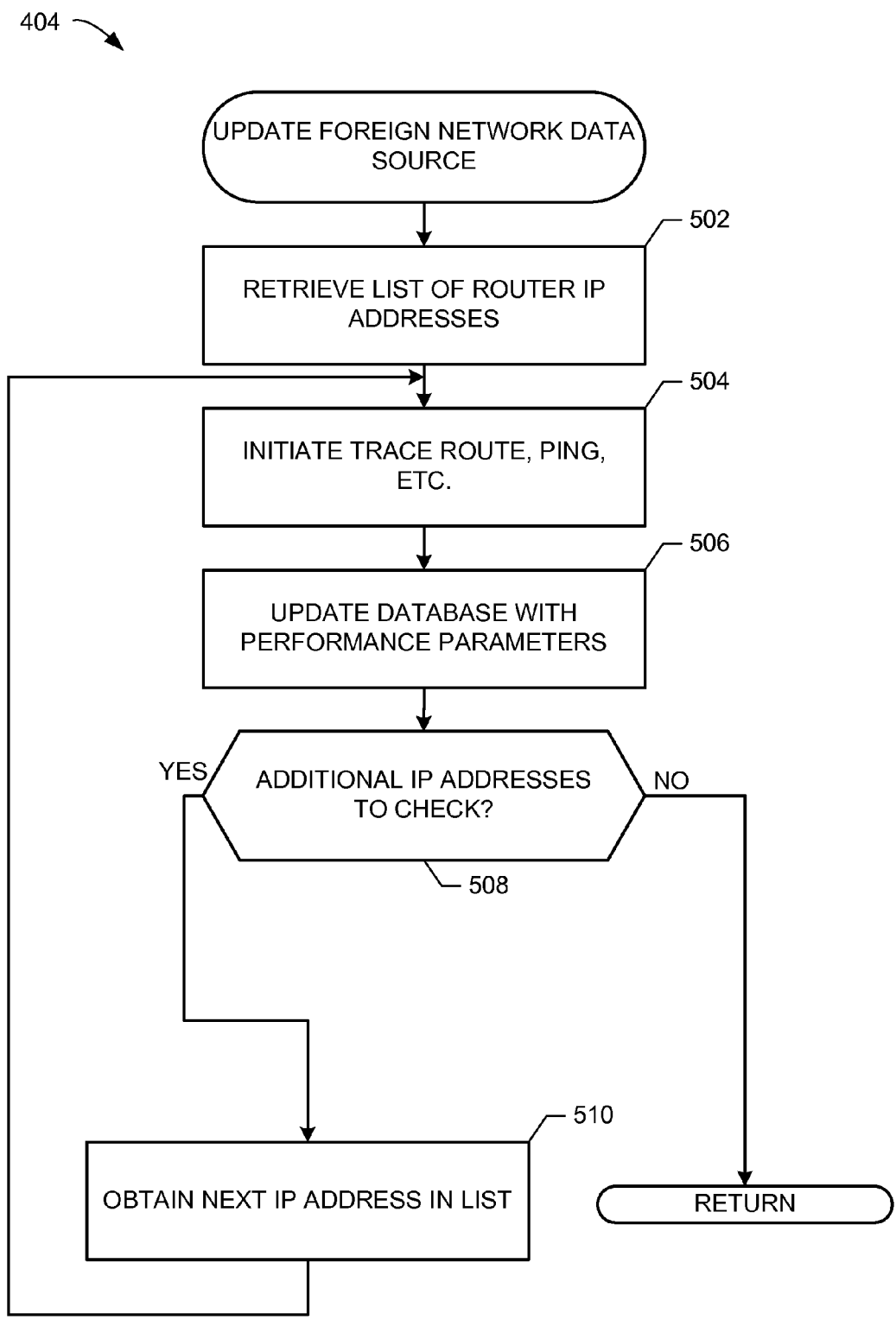

FIGS. 4A, 4B, and 5 illustrate example machine-accessible instructions that may be executed to implement the example CSA broker 110 of FIGS. 1 and 2. The example machine-accessible instructions of FIGS. 4A, 4B, and 5 may be carried out by a processor, a controller and/or any other suitable processing device. For example, the example machine-accessible instructions of FIGS. 4A, 4B, and 5 may be embodied in coded instructions stored on any tangible computer-readable medium such as a flash memory, a CD, a DVD, a floppy disk, a read-only memory (ROM), a random-access memory (RAM), a programmable ROM (PROM), an electronically-programmable ROM (EPROM), and/or an electronically-erasable PROM (EEPROM), an optical storage disk, an optical storage device, magnetic storage disk, a magnetic storage device, and/or any other medium which can be used to carry or store program code and/or instructions in the form of machine-readable instructions or data structures, and which can be accessed by a processor, a general-purpose or special-purpose computer, or other machine with a processor (for example, the example processor platform P100 discussed below in connection with FIG. 6). Combinations of the above are also included within the scope of computer-readable media. Machine-readable instructions comprise, for example, instructions and/or data that cause a processor, a general-purpose computer, special-purpose computer, or a special-purpose processing machine to implement one or more particular processes. Alternatively, some or all of the example machine-accessible instructions of FIGS. 4A, 4B, and 5 may be implemented using any combination(s) of ASIC(s), PLD(s), FPLD(s), discrete logic, hardware, firmware, etc. Also, some or all of the example machine-accessible instructions of FIGS. 4A, 4B, and 5 may instead be implemented manually or as any combination of any of the foregoing techniques, for example, any combination of firmware, software, discrete logic and/or hardware. Further, many other methods of implementing the example operations of FIGS. 4A, 4B, and 5 may be employed. For example, the order of execution of the blocks may be changed, and/or one or more of the blocks described may be changed, eliminated, sub-divided, or combined. Additionally, any or all of the example machine-accessible instructions of FIGS. 4A, 4B, and 5 may be carried out sequentially and/or carried out in parallel by, for example, separate processing threads, processors, devices, discrete logic, circuits, etc.

The example machine-accessible instructions of FIG. 4A begin with the example foreign network quality manager 208 determining whether to update the example foreign network data source 130 with one or more parameters indicative of QoS characteristics (block 402). As described above, updates to the foreign network data source 130 may occur on a periodic, aperiodic, scheduled, event-based, and/or manual basis. For example, the foreign network quality manager 208 may perform one or more speed and/or latency tests on one or more foreign networks every day during specified time-slots. One example time-slot may include one or more tests during the hours of 10 AM and 11:59 AM, which is typically one period of time in which networks experience a particularly high demand. In the event that the example foreign network quality manager 208 determines that one or more network tests should occur (block 402), control advances to block 404 to update the example foreign network data source 130 with parameters indicative of QoS characteristics, such as latency time(s), upload speed(s), and/or download speed(s).

Turning to FIG. 5, example machine-accessible instructions are shown to update the example foreign network data source 130 (block 404). The example foreign network quality manager 208 retrieves a list of router IP addresses (block 502) associated with one or more known foreign networks from which customers/subscribers make one or more requests for services from the media distribution system 109. Additionally or alternatively, the example foreign network quality manager 208 may add to the example table 300 of FIG. 3 in response to an IP address received from a requesting customer located at a foreign network area that has not previously been tested. The foreign network(s) and corresponding server(s) and/or router(s) are tested, such as by a trace-route, a ping, and/or any similar network test that provides information indicative of QoS characteristics (block 504). Results are stored in the example foreign network data source 130 (block 506), and the example foreign network quality manager 208 determines whether additional foreign network(s), server(s), and/or router(s) should be tested (block 508). If so, the next IP address from, for example, the list of foreign network router(s) is obtained (block 510) and control returns to block 504.

Returning to FIG. 4A, the example services request manager 202 of the CSA broker 110 monitors for instances when one or more customers requests services from the media distribution system 109 (block 412). If not, the example services request manager 202 continues to wait for such instances and/or the foreign network quality manager 208 determines whether to update the example foreign network data source 130 (block 402). When one or more customers requests services (block 412), the example services request manager determines whether such request(s) originate from a foreign network (block 414). If not, then all services are enabled for the requesting customer (block 416) because it is assumed that service request(s) originate from within one or more network(s) owned, operated, and/or otherwise controlled by the media distribution system 109, such as the example CSA 102.

However, if the customer request originates from a foreign network (block 414), then the example services request manager 202 identifies a user location, an originating IP address, and/or a carrier name of the foreign network service provider (block 418). Corresponding foreign network QoS parameters are retrieved from the foreign network data source 130 by the foreign network quality manger 208 in response to receiving the originating IP address, user location, and/or carrier name (block 420). As described above, the example foreign network data source 130 may contain one or more tables of foreign network QoS data, such as the example table 300 of FIG. 3. In the event that the example foreign network data source 130 does not include one or more QoS characteristic parameters related to the originating IP address, then the example foreign network quality manager 208 may initiate one or more network tests, as described in connection with FIG. 5.

If any of the foreign network QoS characteristic parameters violates one or more thresholds established by the example media distribution system 109, such as a latency value, a download speed, and/or an upload speed (block 422), then the example customer profile manager 206 obtains profile parameters associated with the requesting customer (block 424), as shown in FIG. 4B. Otherwise, all services are permitted (block 423). The obtained customer profile parameters are compared with the capabilities of the foreign network (block 426) and if the capabilities (that is, the QoS characteristic parameters) fall below one or more threshold limits that are deemed extreme, then services are not provided to the requesting customer (block 428). In other words, in some foreign networks the network capabilities are considered to be so inferior that any attempts at providing the requested service to the customer is believed to result in a lack of success and/or significant customer dissatisfaction.

On the other hand, if the foreign network QoS characteristics are at least at or above a satisfactory level, as set/ determined by the media distribution system 109, then the requested service is permitted (block 428). Further, in the event that such QoS characteristics meet and/or exceed the satisfactory level and are, instead, considered to surpass one or more high-quality threshold limit(s) as set/determined by the media distribution system 109, then the requested services are provided by the example service delivery manager 210 at the highest quality possible (block 430). However, in circumstances where the foreign network is above the satisfactory level, but less than what is deemed a high-quality level, the example customer profile manager 206 determines whether the requesting customer (for example, the household subscriber 120) prefers to minimize latency (block 432). If so, then the example service delivery manager 210 adjusts the delivered service in a manner that reduces the quality of the service (for example, by reducing a frames-per-second parameter, reducing a bits-per-second parameter, etc.) (block 434). Otherwise, if the requesting customer is not particularly concerned with latency parameters, such as a customer that is not engaged in real-time on-line meetings, teleconferences, etc., then the example service delivery manager 210 maintains one or more quality parameters of the delivered service, but directs the requesting customer's device to buffer data related to the service (block 436).

Prior to the actual delivery of the service(s) requested by the requesting customer, the example VPN manager 204 initiates the VPN authorization server 126 to establish a VPN tunnel between the media distribution system 109 and the requesting customer (block 438). As described above, the VPN tunnel allows the CSA broker 110 to run any protocol through a public network and/or a foreign network (such as the example network 106 and/or the example foreign network area 104) without detection of the actual type of protocol being identified. For example, a file transfer protocol (FTP) is blocked by some foreign network service providers because, in part, FTP services typically consume relatively large amounts of network bandwidth. Similarly, an H.323 protocol typically supports real-time transfer of A/V over packet networks and, once detected by a foreign network, may be blocked. However, the established VPN tunnel(s), such as the example VPN tunnels 132 and 134 shown in FIG. 1, prevent snooping and/or other discovery of the type(s) of protocols routed therethrough.

Figure 6:
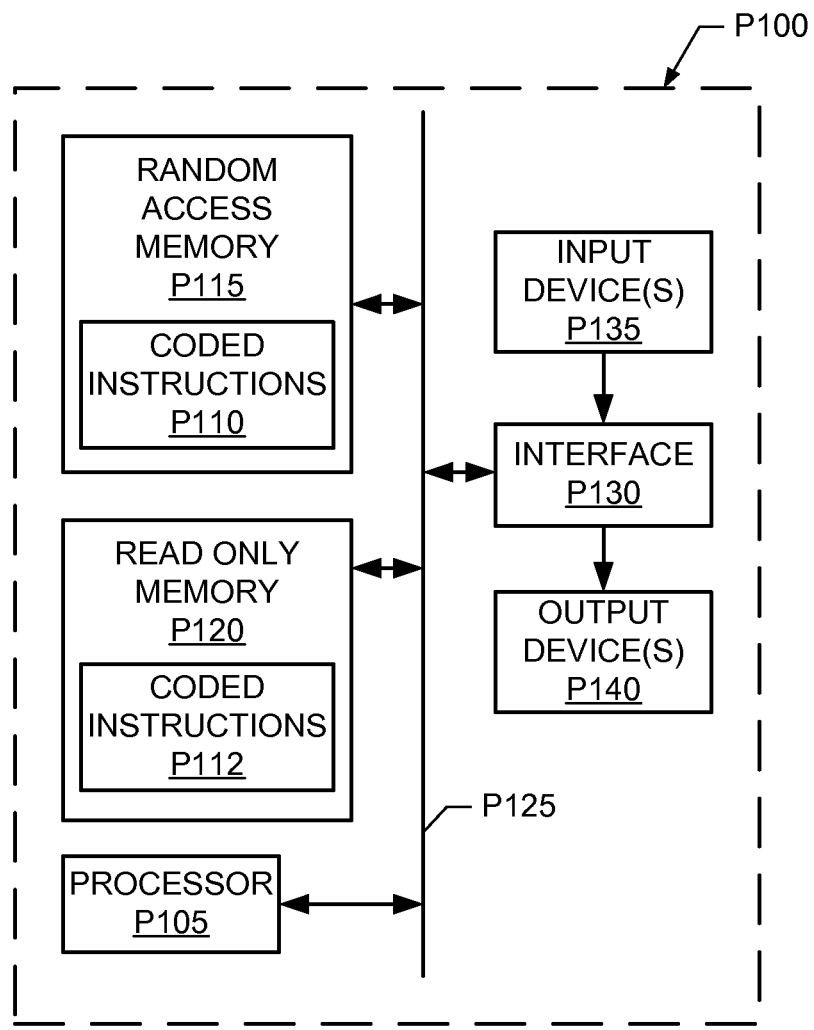

FIG. 6 is a schematic diagram of an example processor platform P100 that may be used and/or programmed to implement any or all of the example CSA broker 110, the example services request manager 202, the example VPN manager 204, the example customer profile manager 206, the example foreign network quality manager 208, and/or the example service delivery manager 210 of FIGS. 1 and 2. For example, the processor platform P100 can be implemented by one or more general-purpose processors, processor cores, microcontrollers, etc.

The processor platform P100 of the example of FIG. 6 includes at least one general-purpose programmable processor P105. The processor P105 executes coded instructions P110 and/or P112 present in main memory of the processor P105 (for example, within a RAM P115 and/or a ROM P120). The processor P105 may be any type of processing unit, such as a processor core, a processor and/or a microcontroller. The processor P105 may execute, among other things, the example machine-accessible instructions of FIGS. 4A, 4B and/or 5 to implement the example methods and apparatus described herein.

The processor P105 is in communication with the main memory (including a ROM P120 and/or the RAM P115) via a bus P125. The RAM P115 may be implemented by dynamic random access memory (DRAM), synchronous dynamic random access memory (SDRAM), and/or any other type of RAM device, and ROM may be implemented by flash memory and/or any other desired type of memory device. Access to the memory P115 and the memory P120 may be controlled by a memory controller (not shown). The example memory P115 may be used to implement the example databases 128 and/or 130 of FIG. 1.

The processor platform P100 also includes an interface circuit P130. The interface circuit P130 may be implemented by any type of interface standard, such as an external memory interface, serial port, general-purpose input/output, etc. One or more input devices P135 and one or more output devices P140 are connected to the interface circuit P130.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method to deliver media services, comprising:
determining whether a request received from a subscriber of a media provider associated with a native network originated from the native network, the request being for the media provider to deliver a desired media service to the subscriber; and
when the request is determined to have originated from a network other than the native network:
identifying a foreign network from which the request originated;
identifying a quality of service parameter associated with delivering a type of media service corresponding to the desired media service to the subscriber through the foreign network;
comparing the quality of service parameter with a first threshold;
when the quality of service parameter fails to satisfy the first threshold, preventing delivery of the desired media service to the subscriber; and
when the quality of service parameter satisfies the first threshold, and in response to detecting constraining of a bandwidth by the foreign network associated with delivering the type of media service, enabling the desired media service to be delivered to the subscriber through the foreign network by establishing a virtual private network tunnel between the subscriber and the media provider, the virtual private network tunnel concealing the desired media service from being detected by the foreign network.

2. A method as defined in claim 1, wherein the identifying of the foreign network further includes receiving an originating Internet protocol address from the subscriber, the originating Internet protocol address associated with the foreign network.

3. A method as defined in claim 2, wherein the originating Internet protocol address is associated with a router of the foreign network.

4. A method as defined in claim 1, wherein the identifying of the quality of service parameter further includes querying a foreign network data source including data indicative of at least one of a foreign network latency value, a foreign network download speed, or a foreign network upload speed.

5. A method as defined in claim 4, wherein the quality of service parameter is indicative of an average quality of service parameter value.

6. A method as defined in claim 4, further including a time-of-day value associated with the quality of service parameter.

7. A method as defined in claim 1, wherein the identifying of the quality of service parameter further includes initiating at least one of a trace route or a ping on at least one of an Internet protocol address or a uniform resource locator associated with the foreign network.

8. A method as defined in claim 1, wherein the first threshold is established by the media provider as a minimum acceptable quality of service.

9. A method as defined in claim 8, further including a second threshold established by the media provider to invoke the desired media service at a reduced quality.

10. A method as defined in claim 9, wherein the reduced quality is at least one of a reduced frames-per-second value or a reduced bits-per-second value.

11. A method as defined in claim 8, further including a second threshold established by the media provider to invoke the desired media service at an alternate quality that is buffered by a subscriber device.

12. A method as defined in claim 8, further including retrieving a customer profile to determine whether to fully enable the desired media service or partially enable the desired media service.

13. A method as defined in claim 12, wherein to partially enable the desired media service, the desired media service is adjusted to reduce latency.

14. A method as defined in claim 12, wherein to partially enable the desired media service, the desired media service is adjusted to buffer data associated with the desired media service at a device of the subscriber.

15. An apparatus to deliver a media service, comprising:
a memory including machine readable instructions; and
a processor to execute the instructions to:
invoke a services request manager to determine whether a request received from a subscriber of a media provider associated with a native network originated from the native network, the request being for the media provider to deliver a desired media service to the subscriber; and
when the request is determined to have originated from a network other than the native network:
invoke the services request manager to identify a foreign network from which the request originated;
invoke a foreign network quality manager to identify a quality of service parameter associated with delivering a type of media service corresponding to the desired media service through the foreign network;
invoke the foreign network quality manager to compare the quality of service parameter with a first threshold;
when the quality of service parameter fails to satisfy the first threshold, invoke a service delivery manager to prevent delivery of the desired media service to the subscriber; and
when the quality of service parameter satisfies the first threshold, and in response to detecting constraining of a bandwidth by the foreign network associated with delivering the type of media service, invoke the service delivery manager to enable the desired media service to be delivered to the subscriber through the foreign network by establishing a virtual private network tunnel between the subscriber and the media provider, the virtual private network tunnel concealing the desired media service from being detected by the foreign network.

16. An apparatus as defined in claim 15, wherein the processor is further to execute the instructions to invoke the service delivery manager to adjust a quality of the desired media service to at least one of maintain or improve a latency parameter of the foreign network.

17. An apparatus as defined in claim 16, wherein the processor is further to execute the instructions to invoke the service delivery manager to reduce at least one of a resolution of the desired media service, a frames-per-second value of the desired media service, or a bits-per-second value of the desired media service.

18. An apparatus as defined in claim 15, wherein the processor is further to execute the instructions to invoke a customer profile manager to identify whether the desired media service is to be delivered with at least one of a threshold latency value or a threshold quality value.

19. An apparatus as defined in claim 18, wherein the processor is further to execute the instructions to invoke the service delivery manager to reduce a quality value of the desired media service to enable the desired media service to be delivered with a latency satisfying the threshold latency value.

20. An apparatus as defined in claim 18, wherein the processor is further to execute the instructions to invoke the service delivery manager to invoke a buffer of a subscriber device to enable the desired media service to be delivered at a quality satisfying the threshold quality value.

21. A tangible machine readable storage device comprising instructions which, when executed, cause a machine to perform operations, comprising:
determining whether a request received from a subscriber of a media provider associated with a native network originated from the native network, the request being for the media provider to deliver a desired media service to the subscriber; and
when the request is determined to have originated from a network other than the native network:
identifying a foreign network from which the request originated;
identifying a quality of service parameter associated with delivering a type of media service corresponding to the desired media service to the subscriber through the foreign network;
comparing the quality of service parameter with a first threshold;
when the quality of service parameter fails to satisfy the first threshold, preventing delivery of the desired media service to the subscriber; and
when the quality of service parameter satisfies the first threshold, and in response to detecting constraining of a bandwidth by the foreign network associated with delivering the type of media service, enabling the desired media service to be delivered to the subscriber through the foreign network by establishing a virtual private network tunnel between the subscriber and the media provider, the virtual private network tunnel concealing the desired media service from being detected by the foreign network.

22. A machine readable storage device as defined in claim 21, wherein the identifying of the foreign network further includes receiving an originating Internet protocol address from the subscriber, the originating Internet protocol address associated with the foreign network.

23. A machine readable storage device as defined in claim 22, wherein the originating Internet protocol address is associated with a router of the foreign network.

24. A machine readable storage device as defined in claim 21, wherein the identifying of the quality of service parameter further includes querying a foreign network data source including data indicative of at least one of a foreign network latency value, a foreign network download speed, or a foreign network upload speed.

25. A machine readable storage device as defined in claim 21, wherein the identifying of the quality of service parameter further includes initiating at least one of a trace route or a ping on at least one of an Internet protocol address or a uniform resource locator associated with the foreign network.

26. A machine readable storage device as defined in claim 21, wherein the first threshold is established by the media provider as a minimum acceptable quality of service.

27. A machine readable storage device as defined in claim 26, further including a second threshold established by the media provider to invoke the desired media service at a reduced quality.

28. A machine readable storage device as defined in claim 27, wherein the reduced quality is at least one of a reduced frames-per-second value or a reduced bits-per-second value.

29. A machine readable storage device as defined in claim 26, wherein the instructions, when executed, cause the machine to perform operations including retrieving a customer profile to determine whether to fully enable the desired media service or partially enable the desired media service.

30. A machine readable storage device as defined in claim 29, wherein to partially enable the desired media service, the desired media service is adjusted to reduce latency.

31. A machine readable storage device as defined in claim 29, wherein to partially enable the desired media service, the desired media service is adjusted to buffer data associated with the desired media service at a device of the subscriber.

* * * * *